(No Model.)
J. B. NEWMAN.
Hose Coupling.
No. 239,827.                    Patented April 5, 1881.
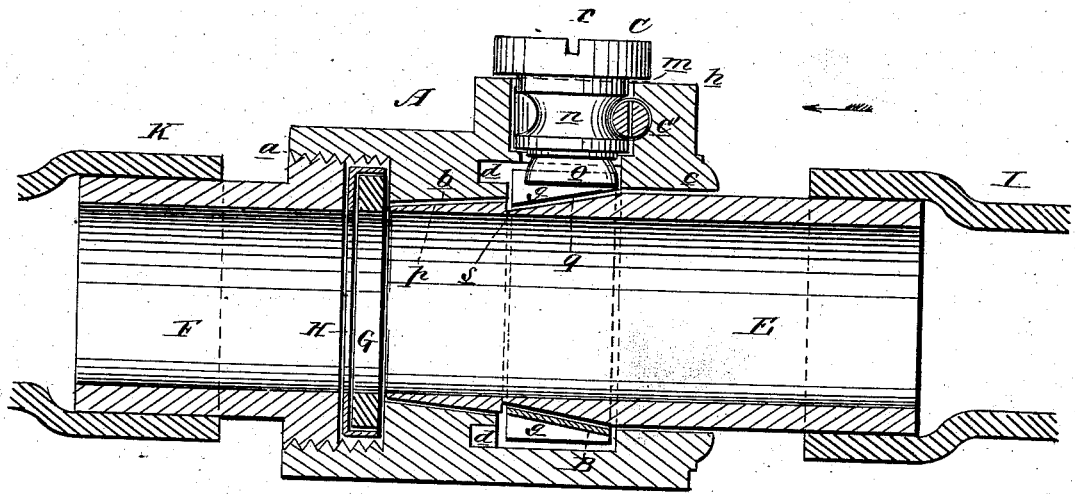
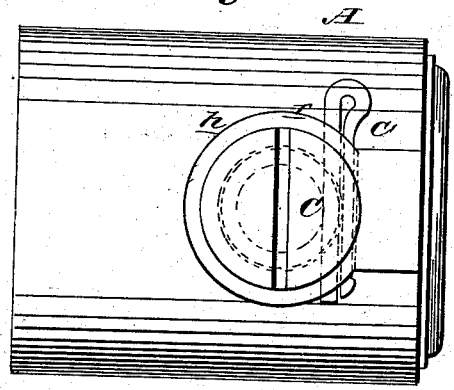
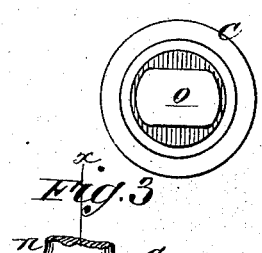
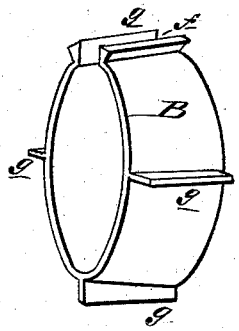
WITNESSES:
Francis McArdle
C. Sedgwick
INVENTOR:
J. B. Newman
BY
ATTORNEYS.
N. PETERS, PHOTO-LITHOGRAPHER, WASHINGTON, D. C.

UNITED STATES PATENT OFFICE.

JOHN B. NEWMAN, OF MILFORD, PENNSYLVANIA.

HOSE-COUPLING.

SPECIFICATION forming part of Letters Patent No. 239,827, dated April 5, 1881.

Application filed October 8, 1880. (No model.)

*To all whom it may concern:*

Be it known that I, JOHN B. NEWMAN, of Milford, in the county of Pike and State of Pennsylvania, have invented a new and Improved Hose-Coupling, of which the following is a specification.

The object of this invention is to provide a more simple and readily connected and disconnected coupling for hose.

The invention consists of a tubular coupling-ring, internally screw-threaded at one end for the connection of a straight section of pipe, and having a conical bore for the reception, at its opposite end, of a tapering-shouldered section of pipe, having also an internal annular socket containing an internally-tapering externally-ribbed transversely-split ring, for engaging with the shoulder on the tapering pipe, and thereby holding said pipe-section coupled fast;
and it consists further of an annularly-grooved stud inserted through a side of the coupling and held therein so that it may be turned by a suitable key, said stud having on its end a cam that enters into an opening in the tapering ring, whereby said ring may be expanded to release the shoulder of the conical pipe and permit the uncoupling of the hose.

Figure 1 is a longitudinal sectional elevation of the device on line *x x*, Fig. 3. Fig. 2 is a plan of the coupling-ring. Fig. 3 is an end elevation of the tapering ring with stud in position. Fig. 4 is a plan of the reverse of the stud. Fig. 5 is a perspective view of the tapering split ring.

Similar letters of reference indicate corresponding parts.

In the drawings, A represents the coupling-ring, internally screw-threaded, as shown at *a*, having a portion of its bore conical, as shown at *b*, and a portion straight, as shown at *c*. Said coupling-ring A has also an internal annular socket, *d*, occupying a place between the conical and straight portions *b c* of the bore, and in this socket *d* is an internally-tapering ring, B, transversely split, as shown at *f*, for the introduction of the cam end of the stud C, and provided externally with strengthening-ribs *g g*, that also serve to hold it in place. A boss, *h*, is formed on the said coupling-ring A, and is bored through, as shown at *m*, to the socket *d*, and in this bore *m* is inserted the stud C, which stud C is held in position by a key, C′, or other suitable device, that is passed transversely through said boss *h* in such a manner as to lie in the annular groove *n* of said stud C, and prevent its removal while it permits rotation. Said stud C has on its end, within the socket *d*, a cam *o*, which, when it lies longitudinally in the split *f* of the ring B, permits said ring B to contract upon the tapering pipe E, and, by turning said stud C a quarter-way round, the cam *o* is brought transversely in said split *f*, thereby expanding said ring B, so that its hold upon the pipe E is released, and the said pipe E may be uncoupled. This pipe E has a straight bore and is provided with an external taper, *p*, at one end, and in rear of the taper *p* with another tapering section, *q*, both of which tapers, *p q*, incline in the same direction, so that at their point of junction a shoulder, *s*, is formed for the engagement of the ring B.

F represents a straight section of pipe, having its enlarged screw-threaded end screwed into the screw-threaded end of the coupling-ring A; and G represents a metallic packing-ring, and H a washer, of leather or other suitable material, set between the ends of the pipes E F, for the purpose of making a tight joint.

I K represent, respectively, sections of hose secured upon the outer ends of the pipes E F.

The stud C being turned so that its cam *o* rests longitudinally in the split *f* of the ring B, the device is ready for coupling. The tapering end of the pipe E is then inserted in the coupling-ring A, and, entering, presses said ring B apart until the shoulder *s* of said pipe E has passed beyond the thicker edge of the ring B. Then said ring B contracts on the taper *q*, behind the shoulder *s*, and holds said pipe E coupled. To uncouple said pipe E, a screw-driver or other suitable tool is applied in the nick *r* of the stud C, and said stud C thereby turned a quarter round, whereby the cam *o* is brought transversely in the slit *f*, and forces said ring B open, so that said pipe E can be uncoupled.

By this device hose or pipe can be coupled and uncoupled more quickly and as securely as by any of the devices in general use, and without the use of wrench, spanner, or any other special tool, a screw-driver, jack-knife, or any tool that will enter the nick r of the stud C being the only instrument necessary.

Having thus described my invention, I claim as new, and desire to secure by Letters Patent—

1. A hose-coupling constructed substantially as herein shown and described, consisting of the internally-tapered and annularly-socketed coupling-ring A, tapering split ring B, stud C, provided with cam o, and tapered pipe E, provided with tapers p q, and shoulder s, operated as set forth.

2. In a hose-coupling, the coupling-ring A, provided with annular socket d, stud-bore m, tapering split ring B, and stud C, having end cam, o, substantially as and for the purpose described.

3. In a hose-coupling, the combination, with the coupling-ring A, provided with boss h, having a bore, m, of the stud C, provided with annular groove n and cam o, and key C', substantially as herein shown and described.

JOHN B. NEWMAN.

Witnesses:
WILLIAM ANGLE,
WILLIAM MITCHELL.